(12) United States Patent
Schumacher et al.

(10) Patent No.: US 7,785,560 B2
(45) Date of Patent: Aug. 31, 2010

(54) PURIFICATION OF FINELY DIVIDED, PYROGENICALLY PREPARED METAL OXIDE PARTICLES

(75) Inventors: Kai Schumacher, Hofheim (DE); Juergen Flesch, Rayong (TH); Volker Hamm, Bad Saeckingen (DE)

(73) Assignee: EVONIK DEGUSSA GmbH, Essen (DE)

( * ) Notice: Subject to any disclaimer, the term of this patent is extended or adjusted under 35 U.S.C. 154(b) by 294 days.

(21) Appl. No.: 10/567,577

(22) PCT Filed: Jun. 22, 2004

(86) PCT No.: PCT/EP2004/006718
§ 371 (c)(1),
(2), (4) Date: Feb. 8, 2006

(87) PCT Pub. No.: WO2005/019107
PCT Pub. Date: Mar. 3, 2005

(65) Prior Publication Data
US 2006/0286028 A1 Dec. 21, 2006

(30) Foreign Application Priority Data

Aug. 20, 2003 (DE) ................................ 103 38 219
Sep. 17, 2003 (DE) ................................ 103 42 827

(51) Int. Cl.
*C01B 13/14* (2006.01)
*C01B 7/00* (2006.01)
*C01B 33/12* (2006.01)
*B01D 53/50* (2006.01)
*B01D 53/68* (2006.01)
*B01D 53/70* (2006.01)
*B01D 47/06* (2006.01)
*B01D 11/00* (2006.01)
*C01G 23/047* (2006.01)
*C01F 7/02* (2006.01)
*B01F 1/00* (2006.01)

(52) U.S. Cl. ................ 423/592.1; 423/240 R; 423/241; 423/336; 423/337; 423/611; 423/612; 423/625; 423/658.5

(58) Field of Classification Search ................. 423/324, 423/325, 335, 336, 337, 592.5, 659, 658.5, 423/240 R, 241, 341, 592.1, 604–594.19, 423/488; 502/55
See application file for complete search history.

(56) References Cited

U.S. PATENT DOCUMENTS 3,043,659 A * 7/1962 Harris et al. ................ 423/337

(Continued)

FOREIGN PATENT DOCUMENTS

EP 0 709 340 5/1996

(Continued)

OTHER PUBLICATIONS

Deutsch Gold- und Silber-Scheideanstalt vorm. Roessler, STN abstract of DE-1230767, "Purification of highly dispersed oxides," Dec. 22, 1966.*

(Continued)

*Primary Examiner*—Steven Bos
*Assistant Examiner*—Anthony J Zimmer
(74) *Attorney, Agent, or Firm*—Oblon, Spivak, McClelland, Maier & Neustadt, L.L.P.

(57) ABSTRACT

Process for removing halide compounds adhering to finely divided metal oxide particles by means of steam, wherein the metal oxide particles are applied to the upper part of an upright column and migrate downwards by means of gravity, the steam is applied at the bottom end of the column, the metal oxide particles and the steam are fed counter-currently, the metal oxide particles freed of halide residues are removed at the base of the column, steam and halide residues are removed at the head of the column, wherein the column is heated in such a manner that the temperature difference $T_{bottom}-T_{top}$ between the lower part and the upper part of the column is at least 20° C. and a maximum temperature of 500° C. prevails in the column, and the metal oxide particles have a residence time in the column of from 1 second to 30 minutes.

11 Claims, 1 Drawing Sheet

U.S. PATENT DOCUMENTS

Figure 1:
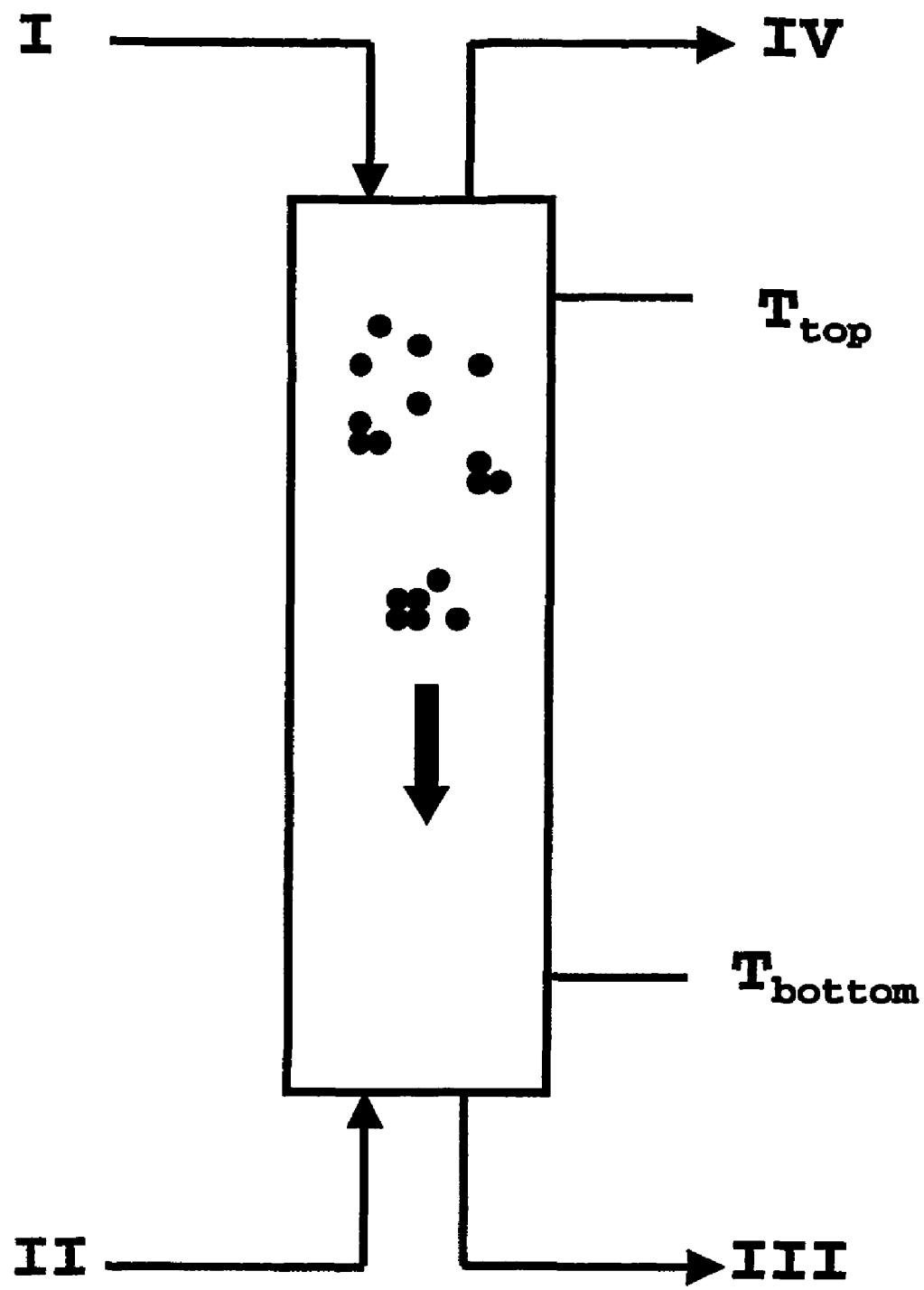

| | | | | |
|---|---|---|---|---|
| 3,723,149 | A | * | 3/1973 | Cole et al. .................. 106/437 |
| 3,896,211 | A | * | 7/1975 | Mayor et al. ................ 423/138 |
| 4,098,874 | A | * | 7/1978 | Mitsche et al. .............. 423/628 |
| 4,503,092 | A | * | 3/1985 | Klebe et al. ................. 427/213 |
| 5,707,599 | A | * | 1/1998 | Northway ............. 423/594.17 |
| 5,855,860 | A | * | 1/1999 | Nishimine et al. .......... 423/337 |
| 6,328,944 | B1 | * | 12/2001 | Mangold et al. ........... 423/278 |

FOREIGN PATENT DOCUMENTS

| | | | |
|---|---|---|---|
| GB | 1003957 | | 9/1965 |
| GB | 1031764 | * | 6/1966 |
| GB | 1197271 | | 7/1970 |

OTHER PUBLICATIONS

Chiko et al. "Dechlorination of titanium dioxide pigment by treatment in horizontally moving fluidized bed with hot moist air," Derwent abstract of SU-635044, Soviet Union Patent publication date Dec. 4, 1978.*

Nauman, Bruce E. "Chapter 6: Design and Optimization Studies" from Chemical Reactor Design, Optimization, and Scaleup, McGraw-Hill, 2002, pp. 187-202.*

* cited by examiner

PURIFICATION OF FINELY DIVIDED, PYROGENICALLY PREPARED METAL OXIDE PARTICLES

The invention provides a process for removing halide compounds adhering to finely divided, pyrogenically prepared metal oxide particles.

It is known to prepare metal oxide particles by flame hydrolysis or by flame oxidation. Metal oxide particles prepared by these processes are usually referred to as pyrogenically prepared metal oxide particles. In general, metal halides, especially chlorides, are used as starting materials therefor. They are converted under the reaction conditions into the metal oxides and hydrohalic acids, usually hydrochloric acid. While the majority of the hydrohalic acid leaves the reaction process in the form of waste gas, some remains adhered to the metal oxide particles or is bonded directly thereto. In a deacidification step, it is possible by means of steam to remove the adherent hydrohalic acid from the metal oxide particles or to substitute halogen atoms bonded directly to the metal oxide by OH or $OH_2$.

DE 1150955 claims a process in which the deacidification is carried out in a fluidised bed at temperatures of from 450° C. to 800° C. in the presence of steam. It is possible in this process to feed metal oxide particles and steam co-currently or counter-currently, preference being given to co-current feeding. The high temperatures required for the deacidification are a disadvantage of this process.

GB-A-1197271 claims a process for the purification of finely divided metal oxide particles, in which metal oxide particles and steam or steam and air are passed counter-currently through a column in such a manner that a fluidised bed does not form. It has thus been possible to lower the required deacidification temperatures to from 400 to 600° C. It has been found, however, that even these temperatures can still have an adverse effect on the metal oxide particles.

EP-B-709340 claims a process for the purification of a pyrogenic silicon dioxide powder. In this process, the required temperatures for deacidification are only from 250 to 350° C. In the process, metal oxide particles and steam are fed co-currently through an upright column from bottom to top. The speed is in the range of from 1 to 10 cm/s in order to allow a fluidised bed to form. The purified silicon dioxide powder is removed at the head of the column. It is a disadvantage that the process must be carried out in such a manner that a fluidised bed is present, which is associated with an increased outlay in terms of control. Furthermore, there is a constant risk with the co-current procedure, in which purified silicon dioxide powder and hydrochloric acid are removed at the head of the column, that the purified silicon dioxide may become contaminated with the hydrochloric acid.

The object of the invention is to provide a process for removing halide residues from metal oxide particles, which process avoids the disadvantages of the prior art. In particular, the process is to be gentle and economical.

The invention provides a process for removing halide compounds adhering to finely divided metal oxide particles by means of steam, the metal oxide particles being formed by reaction of halide-containing starting materials by hydrolyis or oxidising gases, wherein the finely divided metal oxide particles containing residues of halide compounds are applied, together with reaction gases, to the upper part of an upright column and migrate downwards by means of gravity, the steam, optionally mixed with air, is applied at the bottom end of the column, the finely divided metal oxide particles containing residues of halide compounds and the steam are fed counter-currently, the metal oxide particles freed of halide residues are removed at the base of the column, steam and halide residues are removed at the head of the column, which process is characterised in that the column is heated in such a manner that the temperature difference $T_{bottom}-T_{top}$ between the lower part and the upper part of the column is at least 20° C. and a maximum temperature of 500° C. prevails in the column, and the metal oxide particles have a residence time in the column of from 1 second to 30 minutes.

Halide compounds within the scope of the invention are generally hydrogen halides, especially hydrochloric acid. The halide compounds also include those in which a halide atom or halide ion is bonded to metal oxide particles covalently or ionically or by physisorption.

Halide-containing starting materials are generally the corresponding metal chlorides, such as titanium tetrachloride, silicon tetrachloride or aluminium chloride. However, they may also be organometallic compounds, such as chloroalkyl-silanes.

Within the scope of the invention, metal oxide particles are understood as being those which can be obtained from halide-containing starting materials by flame hydrolysis or flame oxidation. Metal oxide particles are also understood as being metalloid oxide particles. They are: silicon dioxide, aluminium oxide, titanium dioxide, cerium oxide, zinc oxide, zirconium oxide, tin oxide, bismuth oxide, as well as mixed oxides of the above-mentioned compounds. Metal oxide particles also include doped oxide particles, as are described in DE-A-19650500. Metal oxide particles are also understood as being metal oxide particles obtained by flame hydrolysis and enclosed in a shell, for example titanium dioxide particles encased in silicon dioxide, as described in DE 10260718.4, filing date 23 Dec. 2002. Of the above-mentioned oxides, silicon dioxide, aluminium oxide and titanium dioxide are of the greatest importance.

The particles are in finely divided form. This is understood as meaning that they are in the form of aggregates of primary particles and usually have a BET surface area of from 5 to 600 $m^2/g$.

Reaction gases are the reaction products of the gases and vapours used that are formed in the preparation of the metal oxide particles by flame oxidation or flame hydrolysis. They may be hydrogen halides, steam, carbon dioxide, as well as unreacted gases.

The process according to the invention can preferably be carried out in such a manner that the temperature difference $T_{bottom}-T_{top}$ is from 20° C. to 150° C., where particular preference may be given to the range from 50° C. to 100° C.

The temperature $T_{bottom}$ is determined at a measuring point located from 10 to 15%, based on the overall height of the reactor, above the bottom end of the reactor.

The temperature $T_{top}$ is determined at a measuring point located from 10 to 15%, based on the overall height of the reactor, beneath the upper end of the reactor.

The process according to the invention can preferably also be carried out in such a manner that the maximum temperature is from 150° C. to 500° C. A range from 350° C. to 450° C. is generally particularly preferred.

The residence time can preferably be from 5 seconds to 5 minutes, and the temperature of the particle stream entering the column can preferably be from about 100° C. to 250° C.

The amount of steam that is introduced is preferably from 0.0025 to 0.25 kg of steam per kg of metal oxide particles per hour, the range from 0.025 to 0.1 kg of steam per kg of metal oxide particles per hour being particularly preferred. A steam temperature of from 100° C. to 500° C. is preferably chosen, where the range from 120° C. to 200° C. may be particularly preferred.

If air is introduced into the column together with the steam, it has proved advantageous to choose an amount of air of from 0.005 to 0.2 m$^3$ of air per kg of metal oxide particles per hour, the range from 0.01 to 0.1 m$^3$ of air per kg of metal oxide particles per hour being particularly advantageous.

The process can be carried out in such a manner that the silicon dioxide powder to be purified and the steam, optionally together with air, form a fluidised bed. More advantageously, however, the process can be carried out so that a fluidised bed does not form. In this case, the outlay in terms of control is reduced and the desired degree of purification is achieved even at low temperatures and with relatively short residence times. This procedure also avoids the discharge of silicon dioxide powder with steam and air, as is possible with the fluidised-bed procedure. After the metal oxide particles have been removed at the base of the column, they may, if desired, be passed through at least one further column in which the maximum temperature does not exceed 500° C. This measure enables the content of adherent halide compounds to be reduced further.

It is possible for the metal oxide particles and the steam and, optionally, air to be fed co-currently or counter-currently therein.

It may be advantageous for the second and subsequent columns to have a temperature difference $T_{bottom} - T_{top}$ between the lower part and the upper part of the columns of at least 5° C.

FIG. 1 illustrates the process in diagrammatic form. In the FIGURE: 1=admission of the metal oxide particles; 2=admission of steam and, optionally, air; 3=exit of the metal oxide particles; 4=exit of gases.

EXAMPLES

Example 1 (According to the Invention)

A particle stream of 100 kg/h of silicon dioxide powder (BET surface area 200 m$^2$/g) having a pH of 1.6, a chloride content of 0.1 wt. % and an initial temperature of 190° C. is introduced in the upper part of an upright column. 5 kg/h of steam having a temperature of 120° C. and 4.5 Nm$^3$/h of air are introduced at the base of the column. The column is heated, by means of an internal heating means, to a temperature $T_{top}$ in the upper region of the column of 350° C. and a temperature $T_{bottom}$ in the lower region of the column of 425° C. After leaving the column (residence time: 10 seconds), the silicon dioxide powder exhibits a pH of 4.2, a chloride content of 0.0018 wt. % and a thickening of 3110 mPas.

Example 2 (Comparative Example)

analogous to Example 1, but with a temperature $T_{bottom}$ of 680° C. and $T_{top}$ of 670° C.

Example 3 (Comparative Example)

A particle stream of 100 kg/h of silicon dioxide powder (BET surface area 200 m$^2$/g, pH 1.6, chloride content 0.1 wt. %, initial temperature 190° C.) and 5 kg/h of steam and 4.5 Nm$^3$/h of air are introduced co-currently at the base of an upright column. The column is heated, by means of an internal heating means, to a temperature $T_{top}$ in the upper region of the column of 350° C. and a temperature $T_{bottom}$ in the lower region of the column of 425° C. After leaving the column (residence time: 10 seconds), the silicon dioxide powder exhibits a pH of 4.0, a chloride content of 0.09 wt. % and a thickening of 2850 mPas.

Example 4 (According to the Invention)

analogous to Example 1, using aluminium oxide powder (BET surface area 99 m$^2$/g, pH 1.7, chloride content 0.6 wt. %, initial temperature 185° C.) instead of silicon dioxide powder, and 6 kg/h of steam having a temperature of 160° C. and 5 Nm$^3$/h of air (residence time: 150 seconds).

Example 5 (According to the Invention)

analogous to Example 1, using 200 kg/h of titanium dioxide powder (BET surface area 46 m$^2$/g, pH 1.7, chloride content 0.6 wt. %, initial temperature 172° C.) instead of 100 kg/h of silicon dioxide powder, and 12 kg/h of steam having a temperature of 180° C. and 10 Nm$^3$/h of air (residence time: 85 seconds). $T_{bottom}$ was 400° C.

Example 6 (According to the Invention)

In the bottom part of an upright column there is arranged a controllable flap for the accumulation of the silicon dioxide powder. A particle stream of 100 kg/h of silicon dioxide powder (BET surface area 200 m$^2$/g) having a pH of 1.6, a chloride content of 0.1 wt. % and an initial temperature of 190° C. is introduced in the upper part of the column. 5 kg/h of steam having a temperature of 120° C. and 4.5 Nm$^3$/h of air are introduced at the base of the column. The column is heated, by means of an internal heating means, to a temperature $T_{top}$ in the upper region of the column of 350° C. and a temperature $T_{bottom}$ in the lower region of the column of 425° C. After leaving the column (residence time: 10 minutes), the silicon dioxide powder has a pH of 4.3, a chloride content of 0.0010 wt. % and a thickening of 3070 mPas.

TABLE

Analytical data of the powders before/after purification

| Example | Powder | pH before | pH after | Chloride content [wt. %] before | Chloride content [wt. %] after | Thickening [mPas] after |
|---|---|---|---|---|---|---|
| 1 | SiO$_2$ | 1.6 | 4.2 | 0.1 | 0.0016 | 3110 |
| 2 | SiO$_2$ | 1.6 | 4.2 | 0.1 | 0.0018 | 2750 |
| 3 | SiO$_2$ | 1.6 | 4.0 | 0.1 | 0.04 | 2850 |
| 4 | Al$_2$O$_3$ | 1.7 | 4.1 | 0.6 | 0.08 | — |
| 5 | TiO$_2$ | 1.7 | 4.0 | 0.6 | 0.004 | — |
| 6 | SiO$_2$ | 1.6 | 4.3 | 0.1 | 0.001 | 3070 |

Examples 1, 4 and 5 show that adherent halides can be removed efficiently by means of the process according to the invention.

A comparison of Examples 1 and 2 shows that, although equally efficient purification of halide residues is possible in Example 2 owing to the higher temperature, the higher temperature adversely affects the thickening effect. Accordingly, the powder obtained in Example 1 exhibits a thickening effect of 3110 mPas, the powder of Example 2 only 2750 mPas. Example 3 exhibits poorer removal of halide residues compared with Example 1, and the powder exhibits a poorer thickening effect.

The thickening effect is determined according to the following method: 7.5 g of silicon dioxide powder are introduced at a temperature of 22° C. into 142.5 g of a solution of an unsaturated polyester resin in styrene having a viscosity of 1300+/−100 mPas, and dispersion is carried out by means of a dissolver at 3000 min$^{-1}$. An example of a suitable unsaturated polyester resin is Ludopal®, BASF. A further 90 g of the unsaturated polyester resin in styrene are added to 60 g of the dispersion, and the dispersing operation is repeated. The thickening effect is the viscosity value in mPas of the dispersion at 25° C., measured using a rotary viscometer at a shear rate of 2.7 s$^{-1}$.

The invention claimed is:

1. A process for removing halide compounds adhering to finely divided metal oxide particles having a BET surface area of from 5 to 600 m$^2$/g with steam, the metal oxide particles being formed by reaction of halide-containing starting materials by hydrolysis or oxidizing gases, wherein said finely divided metal oxide particles containing residues of halide compounds are fed, together with reaction gases, to the upper part of an upright column and migrate downwards through the column due to gravity, steam having a temperature of from 100° C. to 500° C., optionally mixed with air, is fed to the bottom end of the column, the finely divided metal oxide particles containing residues of halide compounds and the steam are fed counter-currently, the metal oxide particles freed of halide residues are removed at the base of the column, and steam and halide residues are removed at the head of the column, which process is characterized in that the column is heated in such a mariner that the temperature difference $T_{bottom}-T_{top}$ between the lower part and the upper part of the column is from 50° C. to 100° C., the maximum temperature in the column is in the lower part of the column, the maximum temperature in the column is from 350° C. to 425° C., and the metal oxide particles have a residence time in the column of from 1 second to 30 minutes.

2. The process according to claim 1, characterized in that the residence time is from 5 seconds to 5 minutes.

3. The process according to claim 1, characterized in that the metal oxide particles entering the column have a temperature of from about 100° C. to 250° C.

4. The process according to claim 1, characterized in that the amount of steam that is introduced is from 0.0025 to 0.25 kg of steam per hour per kg of metal oxide particles.

5. The process according to claim 1, characterized in that, after the metal oxide particles have been removed at the base of the column, they are passed through at least one further column in which the maximum temperature does not exceed 500° C.

6. The process according to claim 5, characterized in that the metal oxide particles and the steam are fed co-currently or counter-currently in the further columns.

7. The process according to claim 5, characterized in that the second and subsequent columns have a temperature difference $T_{bottom}-T_{top}$ between the lower part and the upper part of the columns of at least 5° C.

8. The process according to claim 1, wherein the steam entering the column has a temperature of from 120° C. to 200° C.

9. The process according to claim 2, wherein the steam entering the column has a temperature of from 120° C. to 200° C.

10. The process according to claim 2, wherein the amount of steam that is introduced is from 0.0025 to 0.25 kg of steam per hour per kg of metal oxide particles.

11. The process according to claim 3, wherein the amount of steam that is introduced is from 0.0025 to 0.25 kg of steam per hour per kg of metal oxide particles.

* * * * *